(12) United States Patent
Imanishi et al.

(10) Patent No.: US 7,641,996 B2
(45) Date of Patent: Jan. 5, 2010

(54) FUEL CELL

(75) Inventors: Masahiro Imanishi, Susono (JP);
Haruyuki Nakanishi, Susono (JP);
Shigeaki Murata, Numazu (JP);
Yoshihisa Tamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/991,012

(22) PCT Filed: Aug. 31, 2006

(86) PCT No.: PCT/JP2006/317698

§ 371 (c)(1),
(2), (4) Date: Jun. 19, 2008

(87) PCT Pub. No.: WO2007/026955

PCT Pub. Date: Mar. 8, 2007

(65) Prior Publication Data

US 2009/0148741 A1    Jun. 11, 2009

(30) Foreign Application Priority Data

Aug. 31, 2005 (JP) ............................. 2005-252485

(51) Int. Cl.
*H01M 8/02* (2006.01)
*H01M 48/10* (2006.01)
(52) U.S. Cl. ......................................... 429/26; 429/31
(58) Field of Classification Search .................. 429/26, 429/31, 40, 44
See application file for complete search history.

(56) References Cited

U.S. PATENT DOCUMENTS

| 6,060,188 | A | 5/2000 | Muthuswamy et al. |
| 6,338,913 | B1 * | 1/2002 | Eshraghi ..................... 429/41 |
| 6,444,339 | B1 | 9/2002 | Eshraghi |
| 2003/0035990 | A1 | 2/2003 | Washima |

FOREIGN PATENT DOCUMENTS

| JP | 6-150949 A | 5/1994 |
| JP | 09-223507 | 8/1997 |

* cited by examiner

*Primary Examiner*—Gregg Cantelmo
(74) *Attorney, Agent, or Firm*—Kenyon & Kenyon LLP

(57) ABSTRACT

A fuel cell capable of improving heat exchange efficiency with respect to tubular fuel cells is provided. A fuel cell includes a hollow electrolyte membrane, hollow electrodes arranged on an inside and an outside of the electrolyte membrane, respectively, and an internal charge collector arranged inside of the electrolyte membrane and the electrodes, wherein the internal charge collector is hollow and made of a nonporous member.

3 Claims, 4 Drawing Sheets

FUEL CELL

This is a 371 national phase application of PCT/JP2006/317698 filed 31 Aug. 2006, which claims priority of Japanese Patent Application No. 2005-252485 filed 31 Aug. 2005, the contents of which are incorporated herein by reference.

FIELD OF THE INVENTION

The present invention relates to a fuel cell including tubular fuel cells, and particularly relates to a fuel cell capable of improving heat exchange efficiency with respect to tubular fuel cells.

BACKGROUND OF THE INVENTION

In a conventional polymer electrolyte fuel cell (hereinafter, "PEFC"), electric energy produced by an electrochemical reaction in a membrane electrode assembly (hereinafter, "MEA") that includes a plane electrolyte membrane and electrodes (a cathode and an anode) arranged on both sides of the electrolyte membrane, respectively is extracted to outside via separators provided on both sides of the MEA, respectively. Attention has now been paid to the PEFC as a power source of a battery car or a portable power source because of its operability in a low temperature region, high energy exchange efficiency, short startup time, and small size and light weight as a system.

Meanwhile, a unit cell of the PEFC includes constituent elements such as an electrolyte membrane, a cathode and an anode each including at least a catalyst layer, and separators, and has a theoretical electromotive force of 1.23 V. However, such a theoretical electromotive force is insufficiently low to use as a power source of a battery car or the like. Due to this, a stack PEFC (hereinafter, also simply "fuel cell") configured to arrange endplates or the like on both ends of a multilayer member, in which unit cells are stacked in series, respectively is normally used. Besides, to further improve power generation performance of the fuel cell, it is preferable to downsize each unit cell and to increase a power generation reaction area (output density) per unit area.

To increase the output density per unit area and to improve the power generation performance of a conventional plane fuel cell (hereinafter, also "plane FC"), it is necessary to make the constituent elements thinner. However, if a thickness of the constituent elements is set to be equal to or smaller than a predetermined thickness, functions, strengths, and the like of the respective constituent elements may possibly decrease. For these reasons, it is structurally difficult to increase the output density per unit area in the fuel cell in the plane form.

From these viewpoints, study about a tubular type PEFC (hereinafter, also "tubular PEFC") has been recently underway. A unit cell of the tubular PEFC (hereinafter, also "tubular cell") includes a hollow-shaped MEA (hereinafter, simply "hollow MEA") including a hollow electrolyte layer and hollow electrodes arranged inside and outside of the electrolyte layer, respectively. An electrochemical reaction is provoked by supplying reaction gases (hydrogen-containing gas and oxygen-containing gas) to the inside and the outside of the hollow MEA, respectively. The electric energy generated by this electrochemical reaction is extracted to the outside via charge collectors arranged on the inside and the outside of the hollow MEA. Namely, the tubular PEFC facilitates extracting the power generation energy by supplying one reaction gas (hydrogen-containing gas and oxygen-containing gas) to the inside of the hollow MEA included in each unit cell and the other reaction gas (oxygen-containing gas or the hydrogen-containing gas) to the outside thereof. Further, the tubular PEFC can use the same reaction gas to be supplied to the outside surfaces of the two adjacent unit cells, so that it is possible to dispense with the separators that also exhibit gas shielding performance in the conventional plane PEFC. Therefore, the tubular PEFC can realize effective downsizing of the unit cells.

Several techniques related to the tubular fuel cells (hereinafter, also simply "tubular FC") such as the tubular PEFC have been disclosed so far. For example, Japanese National Publication of Translated Version ("Kohyo") No. 2004-505417 discloses a technique for removing heat generated in a tubular fuel cell (microcell) by extending a length of each of or one of an internal charge collector and an external charge collector (hereinafter, simply "charge collectors") and contacting a coolant with ends of the charge collectors. The Japanese Kohyo No. 2004-505417 also discloses a technique for forming a modular electrochemical cell assembly by collecting a plurality of microcells and arranging a circularly tubular heat exchange tube between the microcell group. With this technique, it is possible to remove a large amount of heat generated in the microcell group.

However, the former technique disclosed in the Japanese Kohyo No. 2004-505417 is the technique for removing the heat via the charge collectors each configured to include linear members. Because of a long distance between the coolant and a heat generator, heat exchange (cooling) efficiency disadvantageously tends to deteriorate. Moreover, with the latter technique, one circularly tubular heat exchange tube is provided for a plurality of microcells. With the latter technique, heat exchange (cooling) efficiency disadvantageously tends to deteriorate.

It is, therefore, an object of the present invention to provide a fuel cell capable of improving heat exchange efficiency with respect to a tubular fuel cell.

SUMMARY OF THE INVENTION

To solve the above-stated problems, the present invention has the following means. Namely, according to an aspect of the present invention, there is provided a fuel cell comprising: a hollow electrolyte membrane; hollow electrodes arranged on an inside and an outside of the electrolyte membrane, respectively; and an internal charge collector arranged inside of the electrolyte membrane and the electrode, wherein the internal charge collector is hollow and made of a nonporous member, and a heat medium is circulated in a hollow portion of the internal charge collector.

According to the present invention, the "internal charge collector arranged inside of the electrolyte membrane and the electrode" means that the internal charge collector is arranged inside of the hollow electrode arranged inside of the electrolyte membrane. Further, the nonporous member means a member except for porous members typified by porous glass, porous ceramic, porous metal, porous carbon, porous resin, and the like. Specific examples of the nonporous member include one or more materials selected from among a group consisting of Cu, Ti, Pt, Au, and the like. An external shape of the internal charge collector according to the present invention is not limited to a specific one as long as the internal charge collector is formed to be able to be arranged inside of the electrode and the electrolyte membrane. However, the internal charge collector is preferably circular so as to be able to easily improve the cooling efficiency of the tubular fuel cells and the like. The internal charge collector is also preferably formed so that the hollow electrode arranged inside of the electrolyte membrane can be arranged outside of the internal charge collector with no space.

According to the aspect of the present invention, a reaction gas channel may be formed on an outer peripheral surface of the internal charge collector.

According to the present invention, the configuration of the reaction gas channel is not limited to a specific one as long as the reaction gas channel is configured to open to an inner peripheral surface of the hollow electrode arranged inside of the hollow electrolyte membrane.

Moreover, according to the aspect (as well as modifications, the same shall apply hereafter) of the present invention, if an area of a contact portion of the outer peripheral surface of the internal charge collector, which portion contacts with the hollow electrode arranged inside of the electrolyte membrane, is X and an area of an opening of the reaction gas channel open to the hollow electrode arranged inside of the electrolyte membrane is Y, X and Y may satisfy $0.02 \leq X/(X+Y) \leq 0.5$.

Furthermore, according to the aspect of the present invention, a coolant may be circulated in a hollow portion of the internal charge collector.

According to the present invention, specific examples of the coolant include not only water but also ethylene glycol.

Moreover, according to the aspect of the present invention, a plurality of the reaction gas channels may be formed, and a member having an excellent heat conductivity to a heat conductivity of a material constituting the internal charge collector may be provided among the plurality of reaction gas channels.

According to the present invention, "among the plurality of reaction gas channels" means a thick portion of the internal collector present among the reaction gas channels. More specifically, it means the thick portion of the internal charge collector located between the hollow portion and a plurality of reaction gas channels.

EFFECTS OF THE INVENTION

According to the aspect of the present invention, since the internal charge collector is hollow, it is possible to make heat exchange with each tubular fuel cell including the hollow electrolyte membrane and the electrodes at quite a close position to the tubular fuel cell by circulating the heat medium. Therefore, the present invention can provide the fuel cell capable of improving the heat exchange efficiency with respect to the tubular fuel cells.

According to the aspect of the present invention, the reaction gas channel is formed on the outer peripheral surface of the internal charge collector, thereby making it possible to ensure diffusivity of gas into the electrode arranged inside of the electrolyte membrane. By so configuring, therefore, it is possible to provide the fuel cell capable of improving the power generation performance by improved gas diffusivity in addition to the above-stated advantages.

Furthermore, according to the aspect of the present invention, the condition is set to $0.02 \leq X/(X+Y) \leq 0.5$. It is thereby possible to provide the fuel cell capable of ensuring gas diffusion efficiency while improving the cooling efficiency of the tubular fuel cells.

Moreover, according to the aspect of the present invention, the coolant is circulated in the hollow portion of the internal charge collector, thereby making it possible to cool each tubular fuel cell at quite a close position to the tubular fuel cell. By so configuring, therefore, it is possible to provide the fuel cell capable of improving the cooling efficiency of the tubular fuel cells.

Further, according to the aspect of the present invention, the member having good heat conductivity is provided in the thick portion of the internal charge collector, thereby making it possible to improve the heat conductivity of the internal charge collector. By so configuring, therefore, it is possible to provide the fuel cell capable of further improving the heat exchange efficiency with respect to the tubular fuel cells.

In the accompanying drawings, 1 denotes an electrolyte membrane, 2 and 3 denote electrodes, 5 denotes a hollow MEA, 10*a*, 10*b*, and 10*c* denote internal charge collectors, 11*a* and 11*b* denote hollow portions, 12 denotes a reaction gas channel, 15 denotes a heat conducting member, and 100 and 200 denote tubular fuel cells.

DETAILED DESCRIPTION

Study about a tubular FC is underway with views of improvement of the output density per unit volume and the like. Similarly to the plane FC, an optimum temperature range of the tubular FC for the electrochemical reaction is decided depending on a type of an electrolyte membrane (e.g., about 100° C. for PEFC). Due to this, to improve power generation performance, it is necessary to cool cells of the tubular FC to fall a temperature of the cells within a predetermined temperature range. On the other hand, to improve a low temperature starting capability of the fuel cell, it is necessary to heat cells in low temperature state in short time. Due to this, the tubular FC includes a member capable of exchanging heat with cells of the tubular FC (hereinafter, "heat exchange member"). However, in the tubular FC, the electric energy is generated in the hollow MEA and the heat exchange member itself is irrelevant to power generation. With a view of improving the output density per unit volume, it is preferable to save space of the heat exchange member. On the other hand, a technique for improving cooling efficiency by contacting part of cells of the tubular FC with a coolant has been disclosed so far (see, for example, Japanese Patent Application Laid-Open No. 9-223507). With the technique, it is disadvantageously difficult to increase the output density per unit volume since the number of sealing portions for sealing the coolant increases.

The present invention has been made from such viewpoints, and a gist of the present invention is to improve the heat exchange efficiency with respect to the tubular fuel cells and to reduce a size of the fuel cell (downsize the fuel cell) by forming an internal charge collector arranged in a hollow portion of each unit cell of the tubular fuel cell into a hollow shape and circulating a heat medium in the hollow portion of the internal charge collector. Furthermore, if a reaction gas channel is formed on an outer peripheral surface of the internal charge collector, it is possible to ensure diffusivity of reaction gas in addition to the above-stated advantages.

Besides, if a material having a good heat conductivity is included in a thick portion of the internal charge collector, heat exchange efficiency can be further improved.

A fuel cell according to the present invention will be specifically described with reference to the drawings.

Figure 1A:
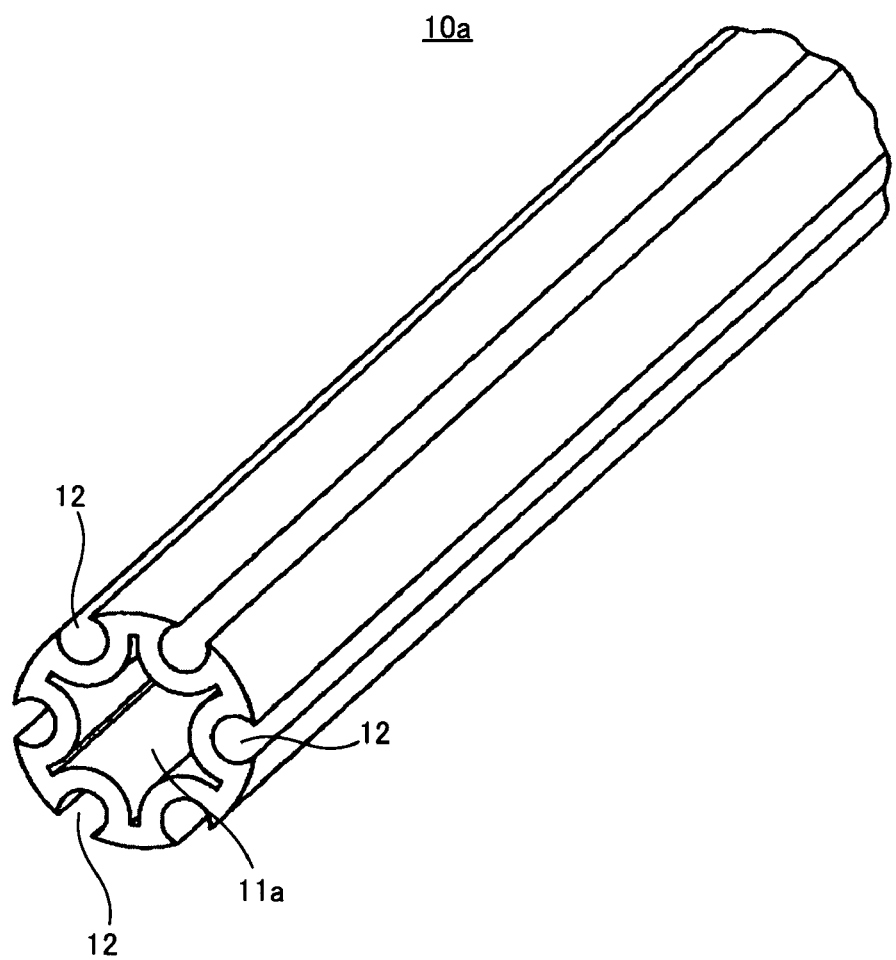
FIG. 1 is a schematic diagram showing constituent elements of a fuel cell according to a first embodiment of the present invention.
Figure 1B:
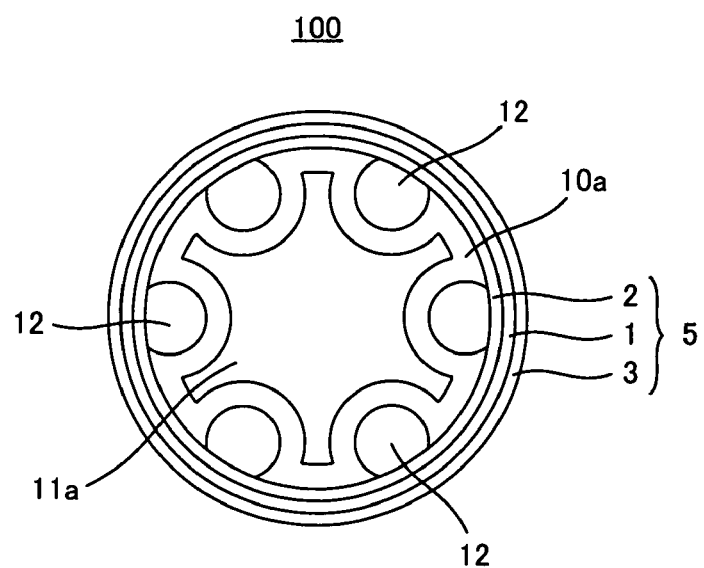

FIG. 1 is a schematic diagram showing constituent elements of the fuel cell according to a first embodiment of the present invention. FIG. 1A is a schematic perspective view showing an internal charge collector according to the first embodiment, and FIG. 1B is a schematic cross-sectional view showing a unit cell of a tubular fuel cell including the internal charge collector according to the first embodiment.

As shown in FIG. 1A, an internal charge collector 10a according to the first embodiment is of a hollow shape including a hollow portion 11a, and reaction gas channels 12 each including an opening on its outer circumferential surface are formed in parallel to an axial direction of the internal charge collector. A hollow MEA 5 including hollow electrode 2, an electrolyte membrane 1, and an electrode is arranged outside of the internal charge collector 10a, thereby forming a tubular cell 100 (see FIG. 1B).

In this manner, the internal charge collector 10a according to the present invention includes the hollow portion 11a. Due to this, if a heat medium is distributed into the hollow portion 11a, heat exchange can be made between the heat medium and the hollow MEA 5 via the internal charge collector 10a at a location quite close to the hollow MEA 5. Moreover, since the reaction gas channels 12 are formed on the outer peripheral surface of the internal charge collector 10 according to the first embodiment, the reaction gas can be supplied to the hollow MEA 5 arranged outside of the internal charge collector 10a via these reaction gas channels 12. In other words, according to the first embodiment, it is possible to provide the fuel cell capable of improving the heat exchange efficiency while ensuring diffusivity of the gas into the hollow MEA. In this case, if a coolant such as water is distributed into the hollow portion 11a, the cooling efficiency of the fuel cell can be improved.

Figure 2A:
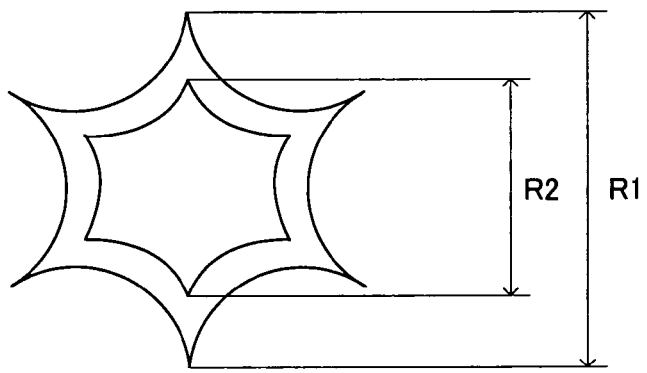
FIG. 2 is a schematic diagram showing an example of steps of manufacturing an internal charge collector according to the first embodiment.
Figure 2B:
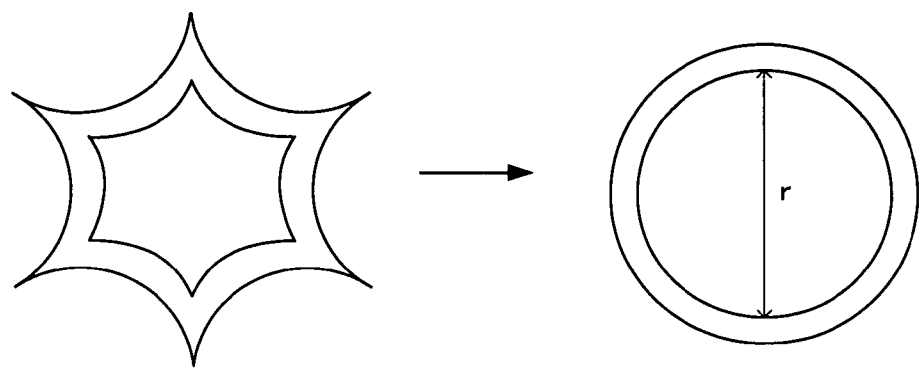
Figure 2C:
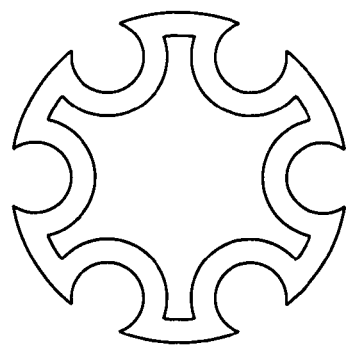

The internal charge collector 10a according to the first embodiment can be manufactured by, for example, the following method or the like. FIG. 2 is a schematic diagram of manufacturing steps. FIGS. 2A to 2C are schematic diagrams showing cross sections of internal charge collectors in the process of manufacturing and after manufacturing with an axial direction of the internal charge collector defined as a normal direction, and a cross section of a hollow member used during manufacturing with an axial direction of the internal charge collector defined as a normal direction. Description will be continued while assuming that an outside diameter and an inside diameter of a convex portion of the internal charge collectors (hereinafter, "charge collecting members") in the process of manufacturing shown in FIGS. 2A and 2B are R1 and R2, respectively, and that an inside diameter of the hollow member shown in FIG. 2B is r.

If the internal charge collector 10a is to be manufactured, a charge collecting member 20 having an external shape corresponding to that of the hollow portion 11a is first produced. Next, the charge collecting member 20 in a softened state is passed through a hollow member 25 satisfying a condition of R2<r<R1 and then pulled out from the hollow member 25 (see FIG. 2B). By doing so, respective convex portions of the charge collecting member 20 are crushed, so that the internal charge collector 10a in the above-stated form can be manufactured (see FIG. 2C). The "charge collecting member 20 in the softened state" means that the charge collecting member 20 is heated at a temperature lower than a melting point and softened.

If the internal charge collector 10a is manufactured by the above method, it is necessary to prevent the charge collecting member 20 from being cut off halfway along the process of pulling out the charge collecting member 20 from the hollow member 25. Due to this, it is preferable to constitute the internal charge collector 10a using a material having such a hardness as not to cut off the charge collecting member 20. If an outer peripheral surface of the internal charge collector 10a manufactured in this manner has a corrosion resistance to be able to resist an environment at the time of actuating the fuel cell, it is necessary to coat a material (e.g., Au or Pt) having good corrosion resistance on the outer peripheral surface and to thereby improve the corrosion resistance of the outer peripheral surface after the charge collecting member 20 is pulled out.

Figure 3A:
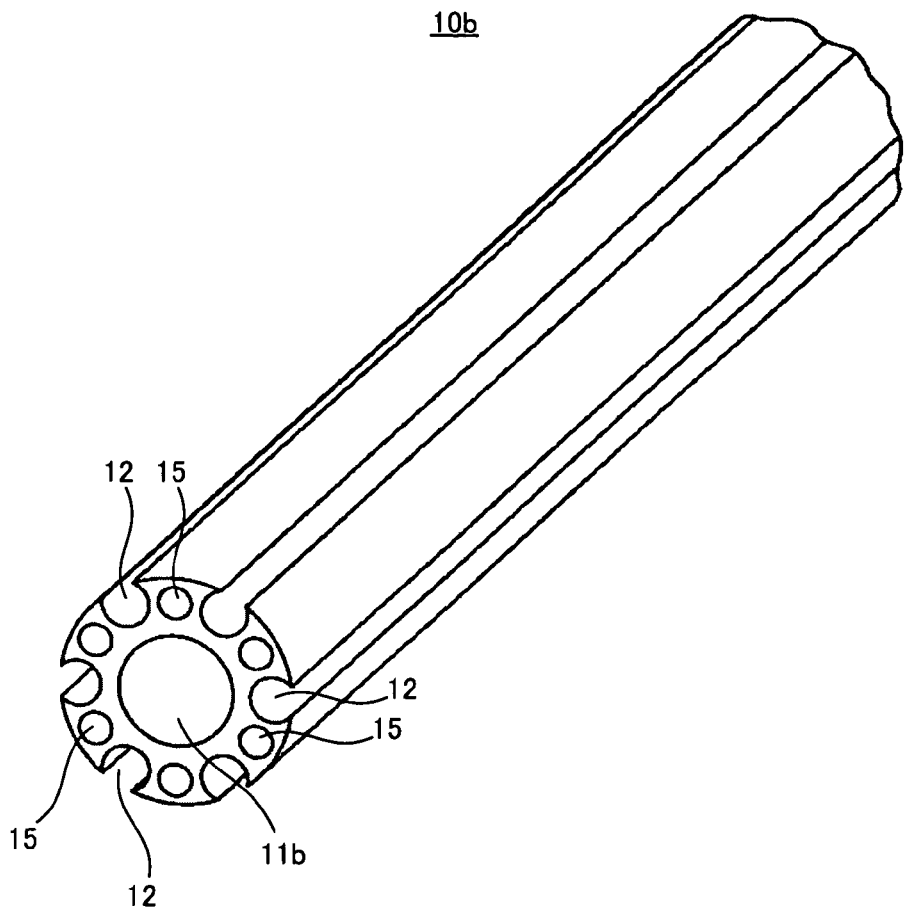
FIG. 3 is a schematic diagram showing constituent elements of a fuel cell according to a second embodiment of the present invention.
Figure 3B:
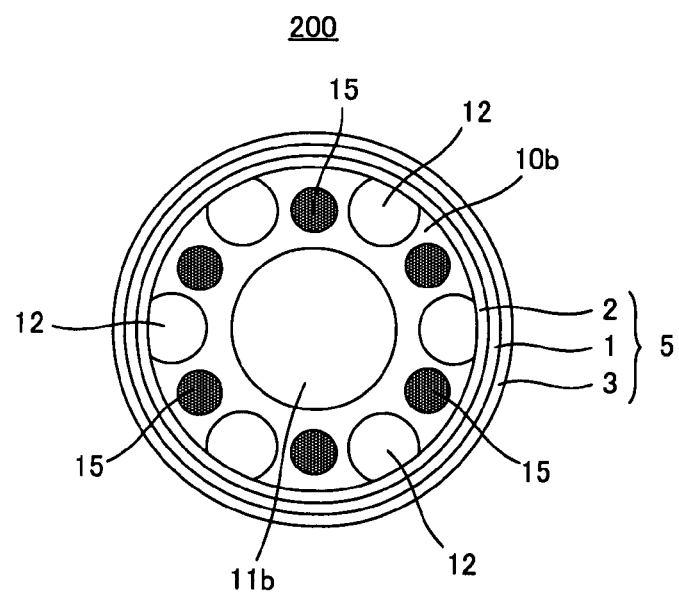

FIG. 3 is a schematic diagram showing constituent elements of a fuel cell according to a second embodiment of the present invention. FIG. 3A is a schematic perspective view showing an internal charge collector according to the second embodiment, and FIG. 3B is a schematic cross-sectional view showing a tubular fuel cell including the internal charge collector according to the first embodiment. In FIG. 3, regions similar in configuration to the constituent elements shown in FIG. 1 are denoted by the same reference symbols used in FIG. 1 and will not be described properly.

As shown in FIG. 3A, an internal charge collector 10b according to the second embodiment is of a hollow shape including a hollow portion 11b, and reaction gas channels 12 each including an opening on its outer circumferential surface are formed on an outer peripheral surface of the internal charge collector. Heat conducting members 15 made of a material (e.g., Cu, At or Pt) having higher heat conductivity than that of constituent elements of the internal charge collector 10b are provided in a thick portion of the internal charge collector 10b. A hollow MEA 5 is provided outside of the internal charge collector 10b, thereby forming a tubular cell 200 (see FIG. 3B).

In this manner, the internal charge collector 10a according to the second embodiment includes the hollow portion 11b and the reaction gas channels 12, and includes the heat conducting members 15 in its thick portion. Due to this, the internal charge collector 10a has good corrosion resistance. On the other hand, even if the thick portion of the internal charge collector 10b is made of a material (e.g., Ti or SUS) having lower heat conductivity, heat conductivity of the internal charge collector 10b can be improved as a whole because of provision of the heat conducting members 15 having good heat conductivity. Further, heat exchange efficiency of the tubular fuel cell 200 can be improved. Since advantages obtained by providing the hollow portion 11b and the reaction gas channels 12 are similar to those of the internal charge collector 10a according to the first embodiment, they will not be described herein.

The internal charge collector 10b according to the second embodiment can be manufactured by, for example, the following procedures. If the internal charge collector 10b is to be manufactured, a hollow charge collecting member including the hollow portion 11b that is to constitute the internal charge collector 10b is produced and then grooves for the reaction gas channels are formed on an outer peripheral surface of the charge collecting member. Next, holes in which the heat conducting members are to be arranged are formed in a thick portion of this charge collecting member. The heat conducting members having good heat conductivity are arranged in the holes thus formed, thereby manufacturing the internal charge collector 10b in the above form.

As described later, the internal charge collector 10b according to the second embodiment is assumed to be used if, for example, the internal charge collector is manufactured using a material having good corrosion resistance but inferior heat conductivity. Accordingly, it is considered that the outer peripheral surface of the internal charge collector 10b is basically made of the material having good corrosion resistance. However, even in this case, the corrosion resistance of the outer peripheral surface can be further improved by adding a step of coating the outer peripheral surface with a material (e.g., Au or Pt) having good corrosion resistance.

FIG. 1 shows the internal charge collector 10a configured to include the hollow portion 11a having a generally asterisk (*) cross section. FIG. 3 shows the internal charge collector 10b configured to include the hollow portion 11b having a circular cross section and the heat conducting members 15. However, the shape of the internal charge collector included in the fuel cell according to the present invention is not limited to those shown in FIGS. 1 and 3. FIG. 4 schematically shows another embodiment.

Figure 4A:
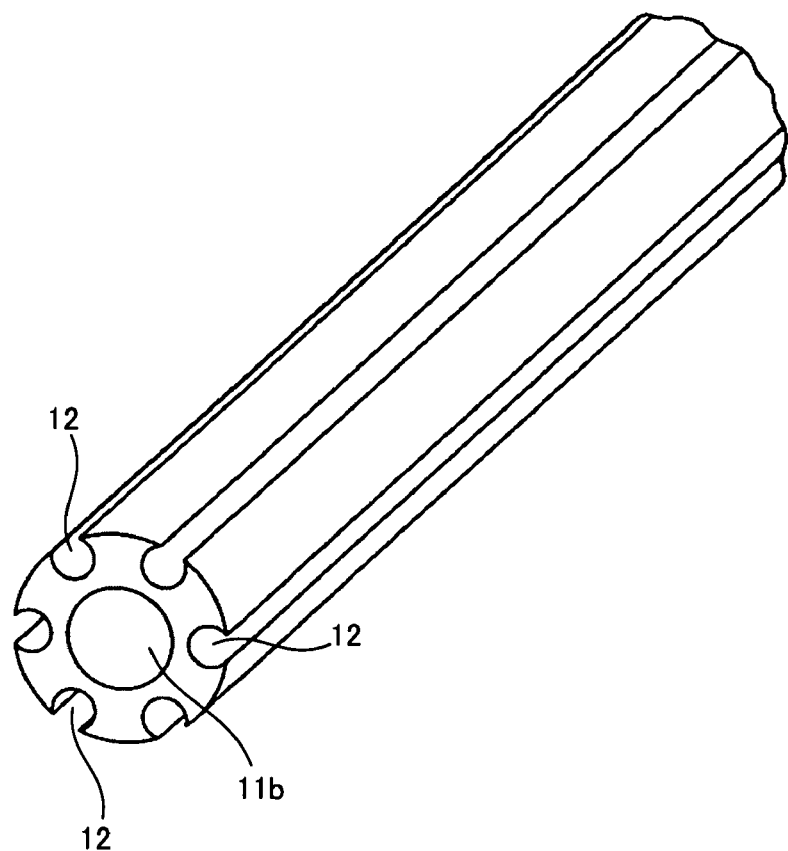
FIG. 4 is a schematic diagram showing constituent elements of a fuel cell according to a third embodiment of the present invention.
Figure 4B:
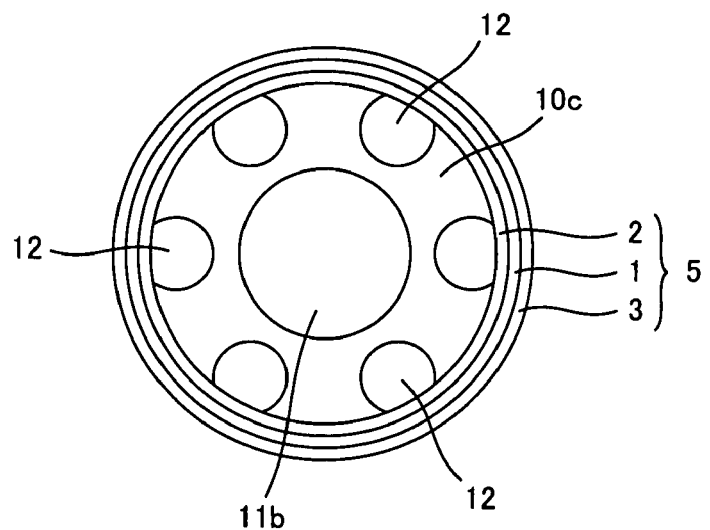

FIG. 4 is a schematic diagram showing constituent elements of a fuel cell according to a third embodiment of the present invention. FIG. 4A is a schematic perspective view showing an internal charge collector according to the third embodiment, and FIG. 4B is a schematic cross-sectional view showing a tubular fuel cell including the internal charge collector according to the third embodiment. In FIG. 4, regions similar in configuration to the constituent elements shown in each of or one of FIGS. 1 and 3 are denoted by the same reference symbols used in each of or one of FIGS. 1 and 3 and will not be described properly.

As shown in FIG. 4A, an internal charge collector 10c according to the third embodiment is of a hollow shape including a hollow portion 11b, and reaction gas channels 12 each including an opening on its outer circumferential surface are formed on an outer peripheral surface of the internal charge collector 10c. Differently from the internal charge collector 10b according to the second embodiment, heat conducting members 15 are not provided. As long as the internal charge collector 10c is made of a material (e.g., Au or Pt) having good corrosion resistance and good heat conductivity, it is possible to attain sufficiently high heat exchange efficiency even if the shape of the hollow portion is not that of the hollow portion 11a or the heat conducting members are not provided. Therefore, if the internal charge collector according to the present invention is made of the material having good corrosion resistance and good heat conductivity, it is possible to sufficiently make heat exchange between the internal charge collector 10c configured as shown in FIG. 4A and the hollow MEA 5 (see FIG. 4B).

The internal charge collector 10c according to the third embodiment can be manufactured through similar procedures to those for the internal charge collector according to the second embodiment except that holes for the heat conducting members 15 are not formed.

If the internal charge collector according to the present invention exhibits the corrosion resistance enough to be able to resist an operating environment of the fuel cell, can make heat exchange with the tubular fuel cells, and is made of nonporous material, constituent material are not limited to specific ones. The above stated conditions related to the corrosion resistance of the internal charge collector may be met by making the entire internal charge collector out of the material (e.g., Au or Pt) having good corrosion resistance or met by coating the outer peripheral surface of the internal charge collector made of Ti or the like with the material (e.g., Au or Pt). If the outer peripheral surface of the internal charge collector is coated with the material having good corrosion resistance, the material that is to constitute the thick portion of the internal charge collector does not necessarily meet the corrosion resistance condition. However, with a view of possible improvement of the heat exchange efficiency of the fuel cell, the thick portion is preferably made of the material having good heat conductivity. Specific examples of the material having inferior corrosion resistance but having good heat conductivity include Cu and Al.

On the other hand, if the outer peripheral surface of the internal charge collector is coated and the thick portion of the internal charge collector is constituted using the material having inferior heat conductivity, it is preferable that the internal charge collector includes the members 15 having good heat conductivity similarly to the internal charge collector 10b according to the second embodiment so as to improve the heat exchange efficiency of the fuel cell by improving the heat conductivity of the internal charge collector as a whole.

In the above-stated description, the configuration in which six reaction gas channels 12 are formed on the outer peripheral surface of the internal charge collector is shown. However, the number of reaction gas channels formed on the outer peripheral surface of the internal charge collector according to the present invention is not limited to six. From viewpoints of increasing reaction gas supplied to the hollow MEA, it is preferable to form as many reaction gas channels as possible. Nevertheless, if the number of reaction gas channels increases and an area of a portion of the outer peripheral surface of the internal charge collector which portion is not open to the hollow MEA (a contact area with the hollow MEA, hereinafter, often "contact area X") decreases, the heat exchange efficiency possibly deteriorates. It is, therefore, preferable that the number of reaction gas channels to be formed in the internal charge collector according to the present invention is set to an appropriate number in light of the diffusivity of reaction gas, the heat exchange efficiency and the like. If the area of the portion open to the hollow MEA is Y, then the contact area X is preferably equal to or larger than 2% of an entire area of the outer peripheral surface of a cooling tube (X+Y) with a view of possible improvement of the cooling efficiency of the tubular fuel cells, and the contact area X is preferably equal to or smaller than 50% of the entire area of the outer peripheral surface of the cooling tube (X+Y) with a view of ensuring gas diffusion efficiency. Therefore, according to the present invention, x and X+Y preferably satisfy $0.02 \leq X/(X+Y) \leq 0.5$, more preferably $0.2 \leq X/(X+Y) \leq 0.4$.

In the above description, the reaction gas channels are configured to be formed in parallel to the axial direction of the internal charge collector. However, the configuration of the reaction gas channels according to the present invention is not limited to this configuration. As long as the reaction gas channels are open toward the hollow MEA and axial both ends of the internal charge collector, the configuration is not limited to a specific one. For example, the reaction gas channels may be formed spirally on the outer peripheral surface of the internal charge collector.

In the present invention, the openings of the reaction gas channels 12 open toward the hollow MEA are preferably wide with a view of improving the gas diffusivity. However, if the hollow MEA is arranged outside of the internal charge collector, an electrode in contact with the internal charge collector or an electrode component (e.g., an electrode component in a molten state obtained by dispersing carbon particles with supported platinum acting as a catalyst for the electrochemical reaction into an electrolyte component in a molten state prepared by a mixture of an electrolyte component such as fluorine-containing ion exchange resin and an organic solvent) enters the reaction gas channels, clogging occurs to the reaction gas channels. Therefore, with views of prevention of the clogging and the like, the openings are preferably narrow.

Due to this, if the reaction gas channels are actually formed, a width of each of the openings is preferably decided in light of the two respects and the like.

The external shape of the internal charge collector according to the present invention is not limited to a specific one. However, the internal charge collector is preferably circular with views of improving adhesiveness to the hollow MEA and improving the heat exchange efficiency and the gas diffusivity.

INDUSTRIAL APPLICABILITY

As stated so far, the fuel cell according to the present invention is suitably used, for example, as a power source of a battery car.

The invention claimed is:

1. A fuel cell comprising:
   a hollow electrolyte membrane;
   hollow electrodes arranged on an inside and an outside of the electrolyte membrane, respectively;
   a hollow, internal charge collector formed of a non-porous member is arranged inside of the electrolyte membrane and the electrode,
   a plurality of the reaction gas channels formed on an outer peripheral surface of the internal charge collector, and
   a member having a higher heat conductivity than a heat conductivity of a material constituting the internal charge collector is provided among the plurality of reaction gas channels.
2. The fuel cell according to claim 1, wherein a reaction gas channel is formed on an outer peripheral surface of the internal charge collector.
3. The fuel cell according to claim 1, wherein, if an area of a contact portion of the outer peripheral surface of the internal charge collector, which portion contacts with the hollow electrode arranged inside of the electrolyte membrane, is X and an area of an opening of the reaction gas channel open to the hollow electrode arranged inside of the electrolyte membrane is Y, X and Y satisfy $0.02 \leq X/(X+Y) \leq 0.5$.

* * * * *